United States Patent [19]

Bancroft

[11] Patent Number: 4,697,685

[45] Date of Patent: Oct. 6, 1987

[54] CLUTCH COVER ASSEMBLY

[75] Inventor: Roger N. Bancroft, Shutford, England

[73] Assignee: Automotive Products plc, Leamington Spa, England

[21] Appl. No.: 871,805

[22] Filed: Jun. 9, 1986

[30] Foreign Application Priority Data

Jun. 12, 1985 [GB] United Kingdom ............... 8514875

[51] Int. Cl.[4] .......................................... F16D 13/60
[52] U.S. Cl. ............................. 192/109 R; 192/70.22
[58] Field of Search ................. 192/52, 70.17, 70.18, 192/70.27, 70.28, 106.1, 106.2, 109 R, 110 S, 110 B, 89 B, 70.13, 70.22

[56] References Cited

U.S. PATENT DOCUMENTS

| 4,531,622 | 7/1985 | Bacher et al. | 192/70.18 |
| 4,560,055 | 12/1985 | Billet | 192/109 R |
| 4,562,910 | 1/1986 | Maycock | 192/70.27 |
| 4,632,237 | 12/1986 | Maycock et al. | 192/98 |
| 4,646,901 | 3/1987 | Lassiaz et al. | 192/109 A |

FOREIGN PATENT DOCUMENTS 994637 4/1961 United Kingdom .
1437640 6/1976 United Kingdom .
2022730A 12/1979 United Kingdom .
2102085A 1/1983 United Kingdom .

*Primary Examiner*—John E. Murtagh
*Assistant Examiner*—Andrew Joseph Rudy
*Attorney, Agent, or Firm*—Solon B. Kemon

[57] ABSTRACT

A clutch cover assembly comprising a cover, a pressure plate, a diaphragm spring acting between the cover and pressure plate to urge the pressure plate outwardly of the cover, and drive straps in the form of leaf springs attached to the cover and pressure plate to retract the latter into the cover when urging by the diaphragm spring is relieved. Latches formed by spring clips on the cover engage the pressure plate to hold it in a partially retracted state after its manufacture and during shipment, to prevent free outward movement of the pressure plate overstressing the drive straps. As the clutch cover assembly is bolted to a driving plate with a clutch driven plate between the driving and pressure plates, the pressure plate eventually comes to an axially stationary position pressing the driven plate against the axially stationary driving plate while the cover moves axially relative to the pressure plate as the bolts are finally tightened. This relative movement between cover and pressure plate disengages the spring clips from the pressure plate and they spring aside so as not to inhibit clutch engaging and dis-engaging axial movements of the pressure plate.

12 Claims, 13 Drawing Figures

CLUTCH COVER ASSEMBLY

BACKGROUND OF THE INVENTION

This invention relates to clutch cover assemblies of the type (hereinafter called "the type referred to") comprising a cover, a pressure plate axially moveable relatively to said cover, coupling means connecting said cover to said pressure plate which rotates with said cover, resilient means disposed between said cover and said pressure plate and acting axially of said cover whereby said pressure plate is urged in a first axial direction away from said cover towards a first position, the urging force applied to said pressure plate from said resilient means being relievable for allowing movement of said pressure plate in an opposite second axial direction into said cover towards a second position.

Clutch cover assemblies of the type referred to can be used to form clutches wherein a driven plate is clampable between the pressure plate and a rotatably driven driving plate with which the cover is secured fast so as to rotate with the driving plate. In automotive use for example, the driving plate can be rotated by a vehicle engine and may be integral with or connected to a flywheel on a crankshaft of the engine.

In known clutch cover assemblies of the type referred to the coupling means can be formed by tangentially disposed leaf-springs forming driving and release straps each attached at one end to the cover and at the other end to the pressure plate. When the urging force applied to the pressure plate from the resilient means is sufficiently relieved, the release straps retract the pressure plate in the second axial direction into the cover to a position corresponding to the clutch being completely disengaged when the cover assembly is in use forming the clutch. Should the release straps be flexed beyond a certain point so as to be over-stressed by an excessive movement by the pressure plate in the first axial direction, this over-stressing impairs their ability to retract the pressure plate. When the clutch cover assembly is not mounted in position to form a clutch, there is a risk of the release straps becoming over-stressed by careless handling such as causing the clutch cover assembly to move swiftly in the first axial direction and then suddenly retarding the cover (as can happen when the cover assembly is dropped to the floor) so that under its own inertia the relatively heavy pressure plate continues moving relatively to cover some further distance in the first direction past the point where the release straps become over-stressed.

Also clutch cover assemblies of the type referred to are known in which the resilient means is acted upon by release levers moved by a release bearing to relieve the urging force provided by the resilient means. For example the resilient means may be a circumferential Belleville portion of a diaphragm spring formed integrally with radially inwardly extending fingers forming the release levers. In the case of cover assemblies for push-type clutches in which the clutch is disengaged by the release bearing pushing on the release fingers in the first axial direction, the envelope or overall space occupied by the cover assembly, prior to connecting with the driving plate, can have an axial length greater than that of the cover due to the release levers being pivoted out through an aperture in a rear of the cover by the resilient means adopting an attitude of minimum stored energy permitted by constraints of the construction of the cover assembly. The axial enlargement of the envelope makes it difficult to fit the cover assembly in a confined space to the driving plate, for example by inserting the cover assembly sideways through a narrow opening in a bell housing of a motor vehicle gearbox. Therefore special service tools have to be provided to retract the pressure plate into the cover so as to act on the resilient means to retract the release levers. Also this retraction of the pressure plate allows the cover assembly to be fitted to the driving plate without being obstructed by the driven plate. In the case of clutch cover assemblies for pull-type clutches in which the clutch is disengaged by the release bearing pulling on the release levers, the resilient means in adopting its position of minimum stored energy may pivot the release levers so far into the cover in the first axial direction towards the pressure plate that they foul against a hub of the driven plate and obstruct the fitting of the cover assembly to the driven plate. To overcome this special service tools may have again to be used to retract the pressure plate into the cover so as to act on the resilient means to swing the release levers in the second axial direction away from the pressure plate In the cases of such pull-and push-type clutches removal of the service tools may be awkward.

SUMMARY OF THE INVENTION

An object of the invention is to provide a clutch cover assembly capable of being constructed to avoid the above disadvantages.

According to the invention a clutch cover assembly of the type referred to further comprises latching means for making an engagement holding said pressure plate in a third position against the urging of said resilient means, said third position being intermediate to said first and second positions, and said latching means being resiliently biased for disengagement in response to a relative axial movement between said cover and said pressure plate having the resultant effect of a movement of said pressure plate in said second direction from said third position and for allowing subsequent movement of said pressure plate to and fro in said first and second directions.

The coupling means may comprise spring release straps arranged to retract the pressur plate in the second axial direction to a clutch released position when the cover assembly is in use and the urging force of the resilient means is relieved by a clutch disengaging movement of the release bearing. The cover assembly can be arranged so that, when the pressure plate is held in the third position by the latching means and a clutch is formed comprising the cover assembly, the first clutch disengaging movement effected by the release bearing to relieve the urging force of the resilient means enables the release straps to retract the pressure plate from the third position towards the second position so that the latching means automatically move out of latching engagement and no longer interfere with clutch engaging and disengaging movements of the pressure plate.

The third position can be selected to correspond with one the pressure plate is in when the clutch is substantially disengaged (i.e. the pressure plate is exerting little or no clamping force on the driven plate). Therefore the use of special removable service tools previously required to retract the pressure plate during the fitting of the cover assembly to the driving plate are no longer required. Also during such fitting the chance of the release levers of a pull-type clutch fouling the driven plate hub is avoided or at least reduced, whilst for a push-type clutch the chance of the release levers detrimentally increasing the axial length of the cover assembly envelope is also avoided or at least reduced.

The same advantages can also be achieved in a preferred arrangement where the third position is selected so that the pressure plate held in that postion (by the latching means) comes to clamp the driven plate against the axially stationary driving plate a little before the cover is fully secured to the driving plate. Then as the cover is moved a final short distance in the first direction as the cover is fully secured in position the driven plate holds the pressure plate stationary relatively to the moving cover, which is effectively the same as moving the pressure plate in the second direction relative to the cover towards the second position, so that the latch means disengages.

BRIEF DESCRIPTION OF THE DRAWINGS

The invention will now be further described, by way of example, with reference to the accompanying drawings in which.

DETAILED DESCRIPTION OF EMBODIMENTS

Figure 1:
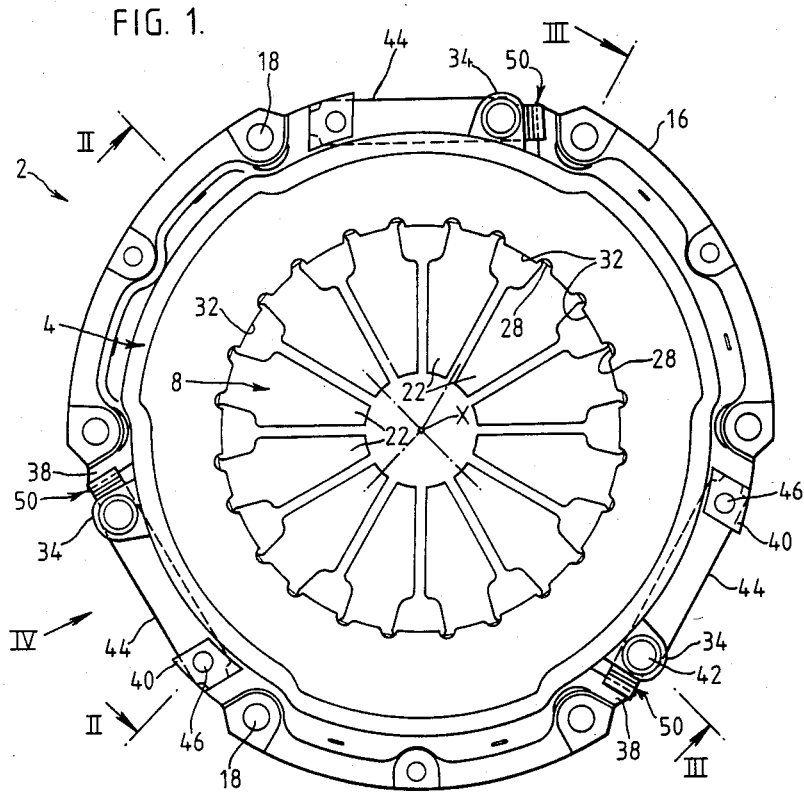
FIG. 1 is a rear elevation of a clutch cover assembly formed according to the invention showing the engaged latching means.

In the drawings like reference numerals identify like or corresponding parts.

With reference to FIGS. 1 to 4 the clutch cover assembly 2 comprises a dish shaped cover 4, for rotation about an axis X, an annular pressure plate 6, and resilient means in this case in the form of a diaphragm spring 8.

The cover 4 has a rear wall 10 centrally apertured at 12, a side wall or skirt 14 of substantially cylindrical or frusto-conical shape, and a mounting flange 16 with a plurality of apertures 18 to receive fixing bolts 19 (one shown in dash-dot line in FIG. 3) for securing the cover fast in rotation with a driving plate 20 (indicated by dash-dot line in FIGS. 2 and 3) which may form part of or be attached to a fly-wheel, for example the fly-wheel of an engine of a motor vehicle.

Diaphragm spring 8 has radially inwardly directed fingers 22 spaced by radial slots and integral with a circumferential Belleville portion 24 pressing on annular fulcrum arrangement 26 on the pressure plate 6. The diaphragm spring 8 is also constrained between two fulcrum rings 28 and 30 held by axially turned hooked tabs 32 on the cover 4. The tendency of the diaphragm spring is to urge the pressure plate 6 in axial direction A.

Outwardly directed lugs 34 on the pressure plate are each disposed in a corresponding opening or bight 36 in the skirt. To either side, each bight 36 is flanked by axially stepped-back platform parts 38 and 40 of the flange 16. Each lug 34 is riveted at 42 to one end of a respective leaf-spring driving and release strap 44 riveted at 46 at its other end to a said platform part 40.

The cover assembly 2 in FIGS. 1 to 4 is for a push-type clutch, therefore when a clutch release bearing 43 (shown in dash-dot line in FIGS. 2 & 3) pushes the fingers 22 in direction A the pressure of the diaphragm spring 8 on the pressure plate 6 is relieved enabling the straps 44 to retract the pressure plate 6 in axial direction B relative to the cover 4.

When the cover assembly 2 is in use in a clutch the cover assembly is connected fast with the driving plate 20 using the bolts 19, a suitable driven plate 45 (shown in dash-dot line) of any kind known per se being also used and having friction material 47 disposed in space 48 between the driving plate and pressure plate 6.

Spring biased latches 50 are provided to initially hold the pressure plate 6 at position (iii) (FIG. 2) corresponding substantially, in a clutch formed using the cover assembly 2, to the position where the pressure plate 6 under the loading of diaphragm spring 8 has just started or is about to start to clamp the driven plate 45 against the driving plate 20.

Figure 2:
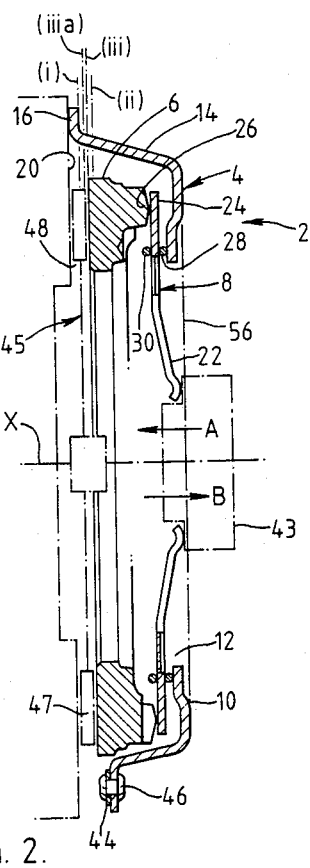
FIG. 2 is a diagrammatic section on line II—II in FIG. 1.
Figure 3:
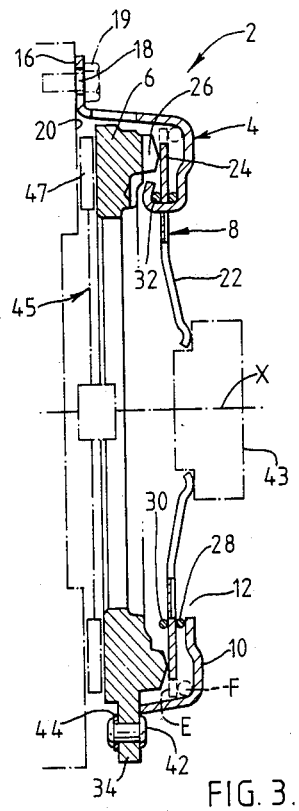
FIG. 3 is a diagrammatic section on line III—III in FIG. 1.

It will be appreciated that when the release bearing 43 moves in direction B to cause disengagement of the clutch when the cover assembly 2 is in use, the release bearing can be moved sufficiently in direction B to swing the diaphragm spring 8 so that the pressure plate 6 can be retracted to at least position (ii) (FIG. 2). On the other hand in a situation where the cover assembly 2 is not in use in a clutch and the latches 50 are not being used to hold the pressure plate 6 and no effort in direction A is being applied to the fingers 22, then within the constraints provided by the construction of the assembly (for example the strength of the straps 44) the diaphragm spring 8 will adopt a position of minimum stored energy causing the pressure plate to move to position (i) (FIG. 2).

Figure 4:
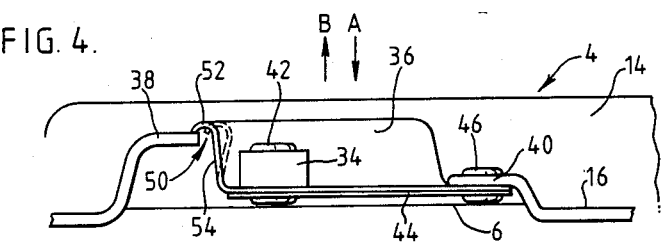
FIG. 4 is a fragmentary diagrammatic view on enlarged scale in the direction of arrow IV in FIG. 1.

Each latch 50 is of resilient material being an end extension of one of the spring leaves of the corresponding strap 44 and comprising a hook 52 on a stem 54. The normal position of each latch 50 is shown in dotted lines in FIG. 4 where the hook 52 does not catch on the adjacent platform 38 as the pressure plate moves to and fro along directions A and B. But when it is desired to hold the pressure plate 6 in position (iii) (FIG. 2), the pressure plate is pushed or pulled into the cover 4 by any suitable method until the stems 54 can be bent under applied force (for example manually applied force) to bring the hooks 52 over the adjacent platforms 38 as shown in FIG. 4 to engage those platforms. Then the pushing or pulling effort in direction B on the pressure plate 6 can be relaxed to allow the diaphragm spring 8 to urge the pressure plate in direction A. This causes the hooks 52 to press firmly on the platforms 38 so that friction prevents them springing back to their normal positions. Therefore the hooks 52 hold the pressure plate at position (iii) (FIG. 2). With the pressure plate in this position, the fitting of cover assembly 2 to the driving plate 20 is not impeded by the driven plate. Also it will be seen in FIG. 2 that axially the rear end of the cover assembly envelope is at dotted line 56, but that the fingers 22 are contained within the envelope making it easier to insert the cover assembly sideways through a narrow opening when fitting the assembly to a pressure plate in confined space.

Once the cover assembly 2 is mounted to form a clutch the latter can be brought into operation by first moving the fingers 22 in direction A (for example by moving the release bearing 43 in that direction by, for example, depressing a clutch pedal of a motor vehicle) so that the pressure plate 6 moves to at least position (ii) (FIG. 2). In doing this the hooks 52 are moved in direction B (FIG. 4) so the pressure on them is relieved This relieves frictional forces between the hooks 52 and platforms 38 and each latch 50 springs automatically under its own resilience into the normal position shown in dotted lines in FIG. 4. This movement is substantially tangential or along at least part of a chord to the general circular shape of the cover assembly The latches 50 can also be used to hold the pressure plate 6 retracted during removal of the cover assembly 2 from the driving plate 20.

After the clutch cover assembly 2 has been manufactured it may be inspected for quality and then the pressure plate 6 is retracted and held in position (iii) (FIG. 2) using the latches 50 for storage and transportation of the cover assembly to the place where it is needed, the supply of a cover assembly with the pressure plate thus latched signifying that the cover assembly is in satisfactory working order.

In FIGS. 5 to 13 various other latches 50 are disclosed each, when engaged, being to hold the corresponding pressure plate 6 in a retracted position corresponding to (iii) in FIG. 2.

Figure 5:
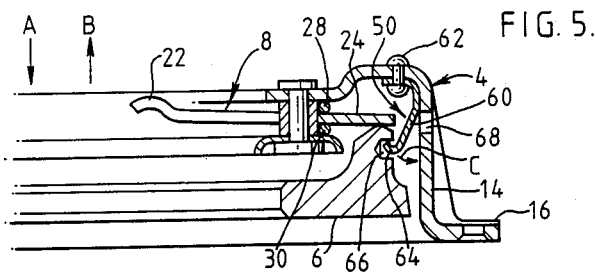
FIGS. 5 and 6 are diagrammatic sections of fragments of two other embodiments of clutch cover assemblies formed according to the invention.

In FIG. 5 a plurality of latches 50 (only one shown) angularly spaced around the cover 4 are provided. Each latch comprises a spring clip 60 riveted at 62 to the cover 4 and having a hooked end 64 engaging a groove or recess 66 in the pressure plate 6 urged in direction A by the diaphragm spring 8 to hold each latch in the recess 66 under friction. When the pressure plate is moved in direction B each latch springs generally radially under its own resilience in direction C towards the inner face of the cover skirt 14 so that the latch can take up its normal position clear of the pressure plate 6. Each latch 50 is opposite a hole 68 in the skirt 14. When the pressure plate 6 is brought to the position in FIG. 5, the latch 50 can be engaged with the recess 66 by inserting a tool (for example a hand tool, possibly a screwdriver) in the hole 68 to push the latch radially inwardly of the cover 4.

Figure 6:
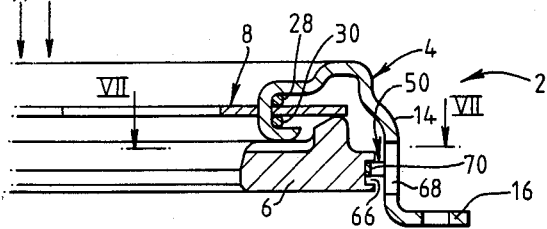
Figure 7:
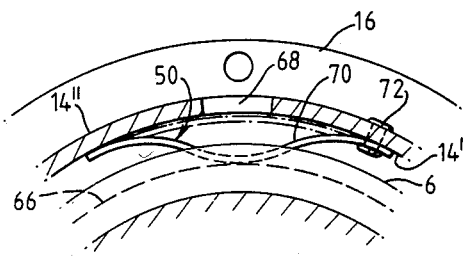
FIG. 7 is a diagrammatic section on line VII—VII in FIG. 6.

In FIGS. 6 and 7, each latch 50 comprises a resilient strip 70 secured at one end, preferably so as to be non-rotatable, to an inner face $14^1$ of the cover skirt 14 by riveting 72. The other end of the strip is free. In its normal position shown in dot-dash line in FIG. 7, the strip 70 substantially conforms to the inner face 141 but more importantly is clear of the pressure plate 6. The width dimension of the strip is generally axially of the cover, and the strip is in a plane substantially normal to the axis of the cover 4. The pressure plate 6 has a circumferentially extending groove 66. When the pressure plate is brought to the position corresponding to (iii) in FIG. 2, the strip 70 can be bowed radially inwardly of the cover (FIG. 7) by pressure of a tool through the hole 68 so that the bowed strip engages in the groove 66 and holds the pressure plate 6 at position (iii) as long as the pressure plate is urged in direction A. When the pressure plate is retracted in direction B the strip 70 springs out of the groove 66 to resume the strip's normal position alongside face $14^1$. In the modification shown in FIG. 10 the strip 70 is supported at or adjacent to each end by a front wall portion 74 of each of two circumferentially spaced holes 76 and 78 in the cover skirt 14. One end 70A of the strip is welded or otherwise affixed to the skirt, in this case to an outer face $14^{11}$ of the skirt. In its normal position the strip 70 is clear of the pressure plate 6 and may extend chord-like between holes 76 and 78 or lie more closely alongside the inner face $14^1$ of the skirt between those holes. When the pressure plate 6 is moved into position (iii) the strip 70 can be bowed radially inwardly of the cover 4 to engage the groove 66 by pressure, for example manual pressure, applied along the strip 70 from its end 70B.

Figure 8:
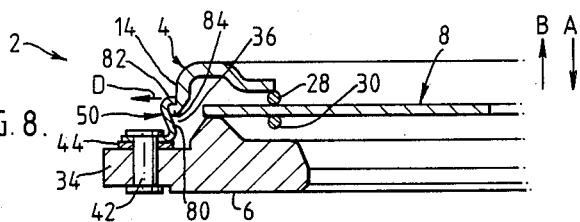
FIGS. 8 and 9 are diagrammatic sections of fragments of two further embodiments of clutch cover assemblies formed according to the invention.

Each latch 50 in FIG. 8 is a resilient clip 80 having a hooked end portion 82 and being secured to the lug 34 of the pressure plate 6 by the rivet 42. When holding the pressure plate 6 in position (iii). The clip hook 82 engages a ledge 84 on the cover 4, which ledge may take the form of a circumferentially extending lip or flange on the cover skirt 14. Release of each latch occurs automatically when the pressure plate is moved in direction B relative to the cover 4 so freeing the hook 82 from ledge 84 that the resilience of the clip 80 swings the hook radially outwardly in direction D to a normal position where the clip is clear of the cover 4.

Figure 9:
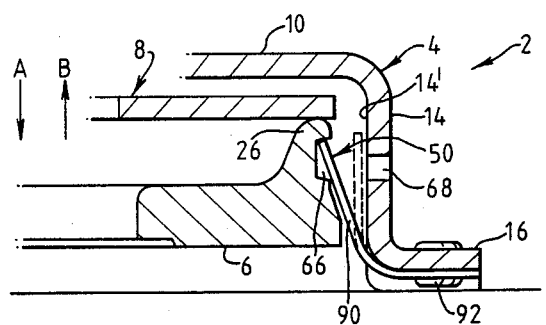
Figure 10:
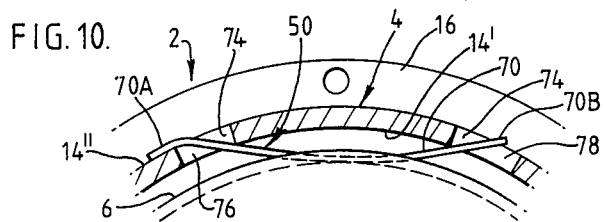
FIG. 10 is a section comparable with FIG. 7 of a modification of the cover assembly in FIGS. 6 and 7.

Each of the latches 50 in FIG. 9 comprises a resilient strip 90 which is secured at one end by rivet 92 to the cover flange 16. In its normal position shown in dot-dash lines, the free end of the strip faces rearwards towards the cover's rear wall 10, and for a substantial part of its length the strip 90 extends from its free end generally axially of the cover proximate the inner face $14^1$ so that the latch 50 is clear of the pressure plate 6. When the pressure plate 6 is moved to position (iii) a tool pushed through the hole 68 can displace the free end of the strip 90 radially inwardly to engage the groove 66 and thus hold the pressure plate which applies bracing force along the latch 50. On the pressure plate 6 being moved in direction B from the position in FIG. 9, the strip 90 resiles to its normal position.

Figure 11:
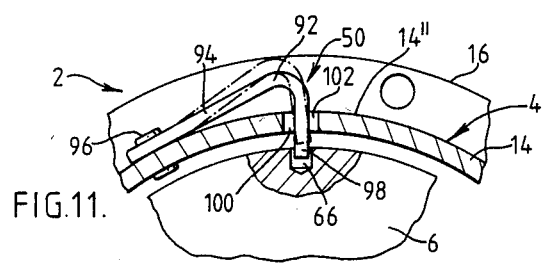
FIG. 11 is a diagrammatic section of a fragment of a still further embodiment of a cover assembly formed according to the invention.

In FIG. 11 each latch 50 comprises a resilient hook-shaped clip 92 of wire or strip material. One arm or stem 94 of the clip is riveted at 96 at its free end to the outer face $14^{11}$ of the cover skirt 14. The other arm or neb 98 of the clip forms a generally radially extending bolt in a radial through hole 100 in the skirt 14. In its relaxed state the clip adopts the position shown in dot-dash lines so that the bolt 98 is clear of the pressure plate 6. When the pressure plate is brought to the position (iii) the clip can be pushed radially inwardly to engage the bolt 98 in the recess or bore 66 in the side the pressure plate so as to hold the latter in position (iii) whilst the diaphragm spring is urging the pressure plate in direction A (FIG. 2). The bolt 98 may be supported by a front wall portion 102 of the hole 100. On the pressure plate 6 being moved relatively to the cover 4 in direction B (FIG. 2) the clip 92 automatically resiles to its normal position, and the pressure plate is unlatched.

Figure 12:
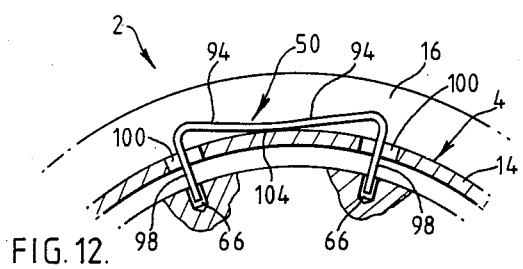
FIG. 12 is a section similar to FIG. 11 of a modification of the embodiment in that FIG.

The latch 50 in FIG. 12 is a modification of that in FIG. 11 and comprises a double hook-shaped clip in which the two stems 94 are continuously integral as a very wide vee disposition secured, for example by welding, at 104 to the cover skirt 14.

Figure 13:
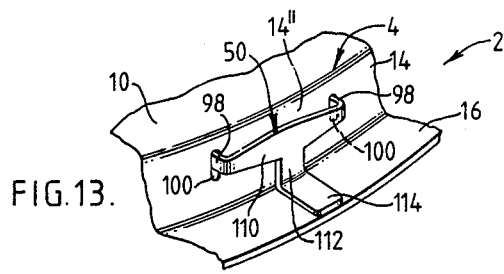
FIG. 13 is a perspective view of a fragment of a modification of the embodiment in FIG. 12.

Latch 50 in FIG. 13 is a modification of the latch in FIG. 12 and made from resilient sheet material forming a body 110 from which are cranked the two latch bolts 98. A leg 112 extending from the body 110 has a cranked foot 114 secured to the cover flange 16. In the normal position of the latch (i.e. the bolts 98 are not in engagement with the pressure plate), the resilient leg 112 holds the body 110 off the outer face $14^{11}$ of the cover skirt 14.

The latching technique has been described above with reference to the drawings as applied to cover assemblies for push-type clutches. It can also be applied in substantially the same manner to cover assemblies for pull-type clutches. In such cover assemblies, roughly speaking, the fulcrum rings 28 and 30 are omitted, and as exemplified in FIG. 3, the diaphragm spring 8 is extended further beyond the fulcrum 26 as indicated at E (FIG. 3) and bears against a substantially fixed annular fulcrum ring indicated at F (FIG. 3), and a pull-type release bearing is substituted for the push-type release bearing 43.

Referring again to FIG. 2, the position in which the latches 50 (see FIGS. 4 to 13) hold the pressure plate 6 can be further along the axial direction to the left in FIG. 2, for example the pressure plate may be held at position (iii a ). Thus the axial width of the friction material 47 is somewhat greater than the distance between position (iii a) and the position of the driving plate surface 20 when the clutch cover assembly is firmly secured to the driving plate by the bolts 19. Accordingly, with the pressure plate 6 held in position (iii a) by the latches 50 the clutch cover assembly can be bolted to the axially stationary driving plate 20. A little before the bolts 19 are fully screwed home, the pressure plate 6 presses the friction material 47 against the driving plate 20. The friction material 47 and the pressure plate 6 are now axially, substantially stationary. As the bolts 19 are finally screwed home this moves the cover 4 to the left in FIG. 2 relatively to the pressure plate 6. This is effectively the same as moving the pressure plate 6 to the right from position (iii a) towards position (ii). Therefore the latches 50 disengage so as not to obstruct axial movement of the pressure plate 6 relative to the driving plate 20. This technique of causing the latches 50 to disengage as the clutch cover assembly is being secured to the driving plate 20 allows the particularly advantageous effect of clamping of the driven plate 45 in position against the driving plate by the pressure plate 6 as a consequence of securing the clutch cover assembly to the driving plate. Such clamping can be used to hold the driven plate 45 in a centred position ready to receive in any manner known per se an input shaft of a transmission, for example an input shaft of a gearbox.

I claim:

1. A clutch cover assembly comprising a cover, a pressure plate axially moveable relatively to said cover, coupling means connecting said cover to said pressure plate which rotates with said cover, resilient means disposed between said cover and said pressure plate and acting axially of said cover whereby said pressure plate is urged in a first axial direction away from said cover towards a first position, the urging force applied to said pressure plate from said resilient means being relievable for allowing movement of said pressure plate in an opposite second axial direction into said cover towards a second position, latching means for making an engagement holding said pressure plate in a third position against the urging of said resilient means, said third position being intermediate said first and second positions, and said latching means being resiliently biased for automatic disengagement in response to a relative axial movement between said cover and said pressure plate having the resultant effect of a movement of said pressure plate in said second direction from said third position towards said second position and for allowing subsequent movement of said pressure plate to and fro in said first and second directions.

2. A clutch cover assembly according to claim 1, in which said latching means is mounted on one of said cover and said pressure plate and said latching means being movable against said resilient biasing into engagement with said other of said pressure plate and said cover for holding said pressure plate in said third position, and said engagement is maintained by pressure on said latching means from said pressure plate under urging by said resilient means until there is said relative axial movement between said cover and said pressure plate for relieving said pressure on said latching means.

3. A clutch cover assembly according to claim 1, in which said coupling means comprises release springs whereby said pressure plate is moved in said second direction when urging force applied to said pressure plate from said resilient means is relieved.

4. A method of providing a clutch using a clutch cover assembly according to claim 1, comprising providing a said clutch cover assembly with said pressure plate held in said third position by engaged said latching means, interposing a driven plate between said pressure plate and a driving plate, securing said clutch cover assembly to said driving plate, and operating clutch release means acting on said clutch for causing the resultant effect of movement of said pressure plate in said second direction relative to said cover from said third position towards said second position whereby said latching means disengages.

5. A clutch cover assembly according to claim 1, in which resilient material forming said latching means provides said resilient biasing of said latching means.

6. A clutch cover assembly according to claim 1, in which said latching means comprises at least one resilient hook.

7. A clutch cover assembly according to claim 1, in which said latching means comprises at least one resilient strip.

8. A clutch cover assembly according to claim 1, in which said latching means comprises at least one resilient wire.

9. A clutch cover assembly according to claim 1, in which said latching means comprises at least one resiliently mounted bolt.

10. A clutch cover assembly according to claim 1, in which said latching means comprises at least one member of resilient sheet material for making said engagement.

11. A clutch comprising a cover assembly according to claim 1.

12. A method of providing a clutch using a clutch cover assembly according to claim 1, comprising providing a said clutch cover assembly with said pressure plate held in said third position by engaged said latching means, interposing a driven plate between said pressure plate and an axially stationary driving plate, and securing said cover to said driving plate by a securing operation whereby said driven plate is pressed against the driving plate by said pressure plate and said cover is moved in said first axial direction relatively to said substantially stationary pressure plate having the resultant effect of movement of said pressure plate relatively to said cover along said second direction towards said second position whereby said latching means disengages.

* * * * *